(12) United States Patent
Ma et al.

(10) Patent No.: US 10,923,104 B2
(45) Date of Patent: Feb. 16, 2021

(54) SYSTEMS AND METHODS FOR CUSTOMIZING AND PROVIDING AUTOMATED VOICE PROMPTS FOR TEXT DISPLAYED ON A SECURITY SYSTEM KEYPAD

(71) Applicant: Ademco Inc., Golden Valley, MN (US)

(72) Inventors: Xinyu Ma, Shanghai (CN); Liu Nie, Shanghai (CN); Rong Gao, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/639,619

(22) Filed: Jun. 30, 2017

(65) Prior Publication Data

US 2019/0005942 A1 Jan. 3, 2019

(51) Int. Cl.
*G10L 13/00* (2006.01)
*G10L 13/08* (2013.01)
(Continued)

(52) U.S. Cl.
CPC .............. *G10L 13/08* (2013.01); *G06F 3/167* (2013.01); *G08B 3/10* (2013.01); *G08B 25/008* (2013.01);
(Continued)

(58) Field of Classification Search
CPC ............... H04M 11/04; H04M 11/045; H04M 2203/4509; H04M 1/72522; G06F 17/2881; G06F 21/577; G06F 16/332; G06F 16/334; G06F 16/48; G06F 3/04815; G06F 21/00; G06F 40/20; G06F 40/30; G06F 40/56; G06F 16/33; G06F 16/58; G06F 16/9032; G06F 16/9535; G06F 16/9577; G08B 25/012; G08B 25/10; G08B 25/08; G08B 13/19645; G08B 13/19656; G08B 13/19691; G08B 25/002; G08B 25/016; G08B 25/14; G08B 29/02; G08B 13/00; G08B 19/00; G08B 21/02; G08B 27/00; G08B 27/006; G08B 25/006; G10L 13/00; G10L 13/043; G10L 2015/223; G10L 15/22; G10L 15/26; H04W 4/90;
(Continued)

(56) References Cited

U.S. PATENT DOCUMENTS 4,821,309 A     4/1989  Namekawa
7,026,926 B1 *  4/2006  Walker, III ............ G08B 27/00
                                                    340/506

(Continued)

FOREIGN PATENT DOCUMENTS

WO     WO 2007/100553 A2     9/2007

OTHER PUBLICATIONS

Extended European search report from corresponding EP patent application 18175943.2, dated Dec. 19, 2018.

*Primary Examiner* — Michael Ortiz-Sanchez
(74) *Attorney, Agent, or Firm* — Fredrikson & Byron, P.A.

(57) ABSTRACT

Systems and methods for customizing and providing automated voice prompts for text displayed on a security system keypad are provided. Some methods can include receiving a security system message from a security system control panel, identifying a customized message that corresponds to the security system message, and transmitting the customized message to a user device for audible transmission of the customized message.

12 Claims, 2 Drawing Sheets

(51) Int. Cl.
*G06F 3/16* (2006.01)
*G08B 3/10* (2006.01)
*G08B 25/10* (2006.01)
*G08B 25/08* (2006.01)
*G08B 25/00* (2006.01)
*G08B 25/14* (2006.01)
*H04L 29/08* (2006.01)

(52) U.S. Cl.
CPC ............ *G08B 25/08* (2013.01); *G08B 25/10* (2013.01); *G08B 25/14* (2013.01); *H04L 67/10* (2013.01)

(58) Field of Classification Search
CPC ....... H04W 4/12; H04W 4/029; H04W 4/021; H04W 4/02; B60R 2025/1016; B60R 2325/205; B60R 25/1012; H04H 20/59; H04L 12/2803; H04L 67/18; H04L 67/22; G06K 9/00362; G06K 9/00664; G06K 9/00671
See application file for complete search history.

(56) References Cited

U.S. PATENT DOCUMENTS

| | | | |
|---|---|---|---|
| 8,345,665 B2 | 1/2013 | Vieri et al. | |
| 8,625,751 B2 | 1/2014 | Bruce et al. | |
| 2003/0151507 A1* | 8/2003 | Andre | B60R 25/102 340/539.13 |
| 2004/0145465 A1 | 7/2004 | Stults et al. | |
| 2004/0192250 A1* | 9/2004 | Hargett | G08B 25/016 455/404.1 |
| 2005/0222820 A1* | 10/2005 | Chung | G08B 13/19645 702/188 |
| 2007/0115108 A1* | 5/2007 | Martin | H04M 11/04 340/506 |
| 2007/0210910 A1* | 9/2007 | Norstrom | G08B 27/001 340/506 |
| 2008/0191857 A1* | 8/2008 | Mojaver | G08B 25/005 340/500 |
| 2010/0002845 A1* | 1/2010 | Zerillo | H04M 3/5116 379/37 |
| 2010/0045460 A1 | 2/2010 | Caler et al. | |
| 2010/0094636 A1 | 4/2010 | Becker et al. | |
| 2012/0188072 A1* | 7/2012 | Dawes | G06Q 50/06 340/514 |
| 2014/0253321 A1* | 9/2014 | Srinivasan | G08B 27/00 340/539.11 |
| 2015/0281656 A1* | 10/2015 | Chien | H04L 67/42 348/143 |
| 2015/0370615 A1* | 12/2015 | Pi-Sunyer | G05B 15/02 700/276 |
| 2016/0019763 A1* | 1/2016 | Raji | G06F 1/263 340/506 |
| 2016/0029190 A1* | 1/2016 | Rattner | H04W 92/02 455/414.4 |
| 2016/0098305 A1 | 4/2016 | Bucsa et al. | |
| 2016/0180699 A1* | 6/2016 | Cote | H04W 4/90 340/506 |
| 2017/0034295 A1* | 2/2017 | Verna | H04L 67/26 |
| 2017/0169688 A1* | 6/2017 | Britt | G08B 21/0453 |
| 2017/0191695 A1* | 7/2017 | Bruhn | G05B 15/02 |
| 2019/0347916 A1* | 11/2019 | Wild | H04L 67/025 |

* cited by examiner

SYSTEMS AND METHODS FOR CUSTOMIZING AND PROVIDING AUTOMATED VOICE PROMPTS FOR TEXT DISPLAYED ON A SECURITY SYSTEM KEYPAD

FIELD

The present invention relates generally to security systems. More particularly, the present invention relates to systems and methods for customizing and providing automated voice prompts for text displayed on a security system keypad.

BACKGROUND

When a user accesses a security system keypad to arm or disarm a security system, the security system will identify the status of zones in a region monitored by the security system before taking action. This is because the security system cannot take any such action to arm or disarm the security system when the status of a zone is fault. The security system keypad can display a visual zone fault message to indicate the fault status, such as, for example, "Zone XXX fault, not ready to arm/disarm," and FIG. 1 is a front view of a security system keypad 100 known in the art displaying a portion of an exemplary visual zone fault message. However, such visual zone fault messages are difficult for a user to understand. Furthermore, because the display screens on known security system keypads are small, the user must inconveniently scroll through the message by pressing a down arrow button to view the entirety of the message.

In some known security systems, the security system keypad or a security system control panel can emit an audio zone fault message, such as, for example, "Zone XXX fault, not ready to arm/disarm." However, such audio zone fault messages are also difficult for a user to understand because the user may not know where Zone XXX is located, especially when the region monitored by the security system includes a large number of zones.

Known security system keypads include little hardware and simple implementation software and logic because the security system keypads merely report information between a user and the security system control panel. Furthermore, known security system control panels have limited memory space. Therefore, known security system keypads and security system control panels cannot store user-friendly, user-defined messages for translating visual or audio zone fault messages into audio that can be easily understood by the user.

In view of the above, there is a continuing, ongoing need for improved systems and methods.

DETAILED DESCRIPTION

Figure 1:
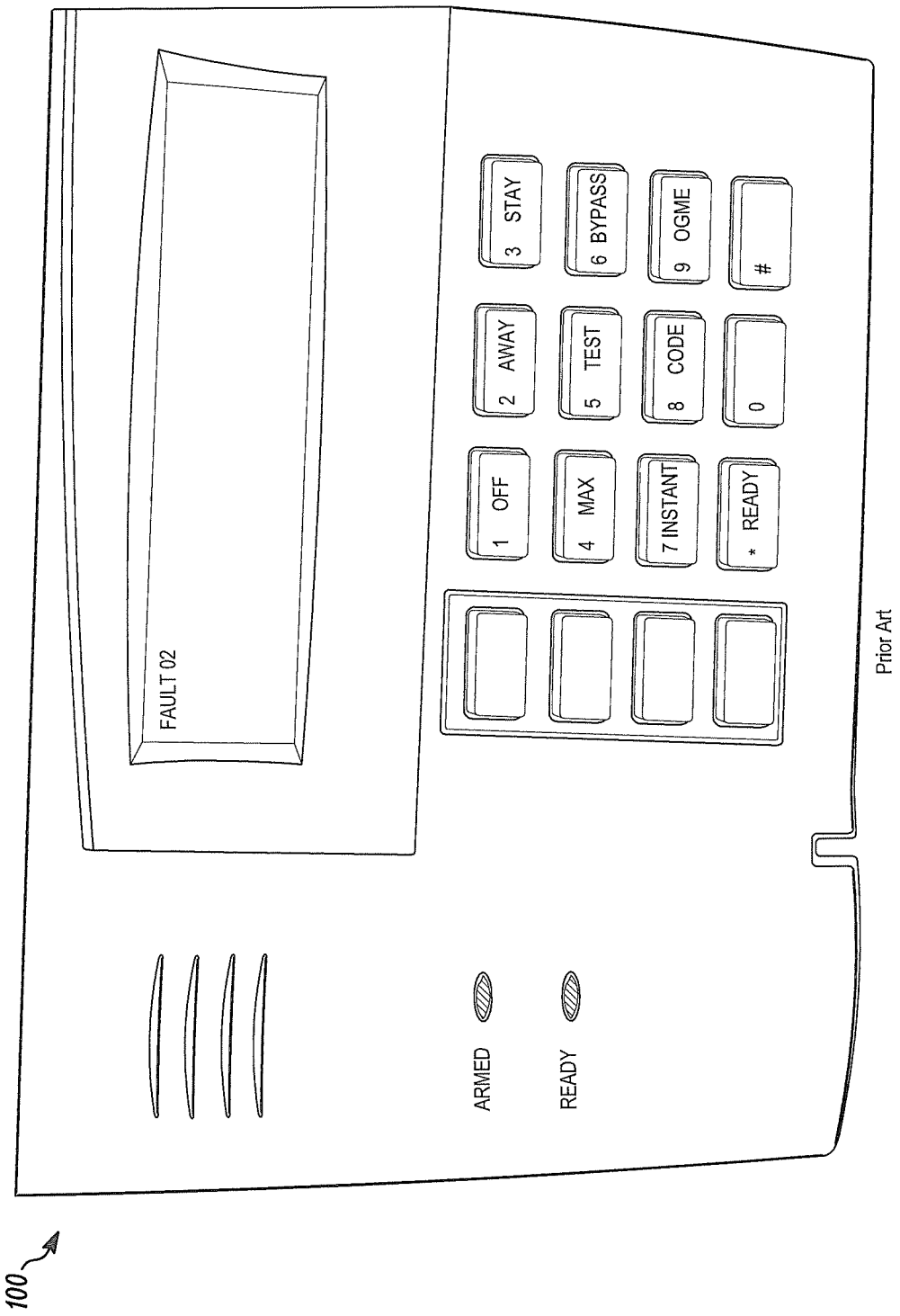
FIG. 1 is a front view of a security system keypad known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for customizing and providing automated voice prompts for text displayed on a security system keypad. For example, in accordance with disclosed embodiments, a user can access a mobile application executing on a mobile device to define his own customized audio messages, the customized audio messages can be stored in a memory device associated with a cloud system or a cloud network, and the cloud system or the cloud network can translate the customized audio messages into verbal speech that can be emitted by the mobile device. Accordingly, systems and methods disclosed herein can solve the problem of local storage space in known security system keypads and security system control panels.

In accordance with disclosed embodiments, the mobile application can be executed on the mobile device and can receive user input identifying a plurality of customized audio messages. For example, the security system control panel can transmit a plurality of zone fault messages to the cloud system, the cloud system can transmit the plurality of zone fault messages to the mobile device, and the mobile device can visually display or audibly emit the plurality of zone fault messages in series. After the mobile device displays or emits each of the plurality of zone fault messages, the mobile device can receive the user input identifying a respective customized audio message that corresponds to the displayed or emitted one of the plurality of zone fault messages. For example, the customized audio message can describe a respective one of the plurality of zone fault messages in a manner that is easily understood by the user. Then, the mobile application can transmit the user input to the cloud system for associating each of the plurality of customized audio messages with the respective one of the plurality of zone fault messages and storing the plurality of customized audio messages in the memory device associated with the cloud system.

In some embodiments, the user input received by the mobile device can include text received by a keypad of the mobile device that identifies the customized audio message, and in some embodiments, the user input can include speech received by a microphone of the mobile device that identifies the customized audio message.

In some embodiments, systems and methods disclosed herein can receive the user input to identify the plurality of customized audio messages during or after installation of the security system, for example, while the security system is installed in and monitoring the region. Accordingly, a user can update the plurality of customized audio messages stored in the memory device associated with the cloud system via the mobile application being executed on his mobile device. However, despite any such updates, systems and methods disclosed herein need not change the interface between the cloud system and the security system control panel.

Figure 2:
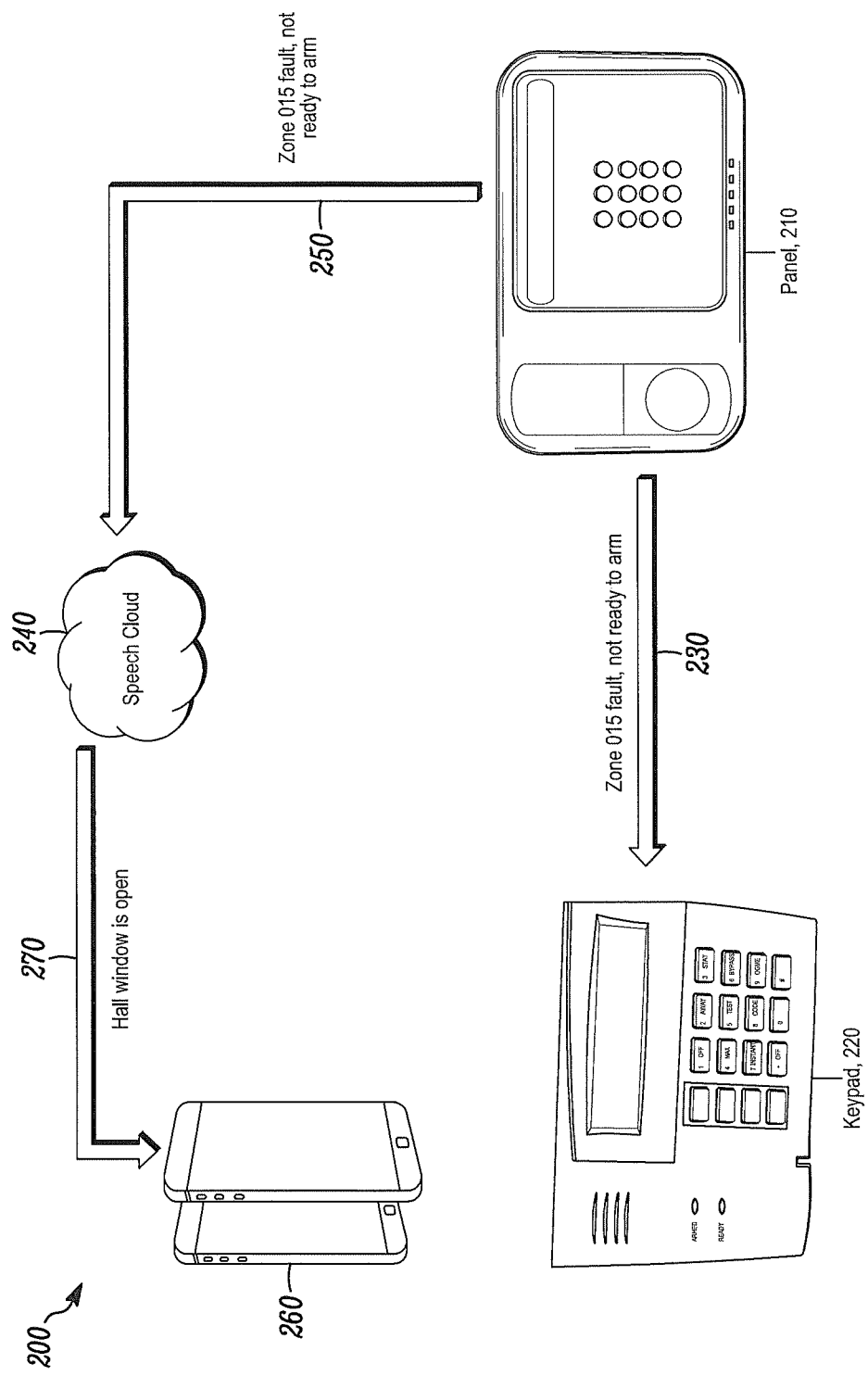
FIG. 2 is a flow diagram of a method in accordance with disclosed embodiments.

FIG. 2 is a flow diagram of a method 200 in accordance with disclosed embodiments. As seen in FIG. 2, the method 200 can include a security system control panel 210 transmitting a visual or audio zone fault message "Zone 015 Fault, Not ready to arm" to a security system keypad 220 as in 230. Substantially simultaneously, the method 200 can include the security system control panel 220 transmitting the same visual or audio zone fault message "Zone 015 Fault, Not ready to arm" to a cloud system 240 as in 250. The cloud system 240 can access a cloud memory device to identify a customized audio message associated with the visual or audio zone fault message received from the security system control panel 220. Then, the method 200 can include the cloud system 240 transmitting the customized audio message "Hall window is open" to a user's mobile device 260 as in 270 for the mobile device 260 to audibly emit the customized audio message.

As exemplified by the method 200, although a visual or audio zone fault message, such as "Zone 015 Fault, Not ready to arm," may not be easily understandable by a user, systems and methods disclosed herein can identify a customized audio message corresponding to the zone fault message for the mobile device 260 to emit to inform the user where a fault is occurring and what is causing the fault.

In some embodiments, the method 200 can include the cloud system 240 translating each of the plurality of customized audio messages to speech prior to transmission to the user's mobile device, for example, in embodiments in which the cloud system 240 receives or stores the plurality of customized audio messages as text.

Although systems and methods are disclosed and described herein in connection with the cloud system 240 communicating with the mobile device 260, it is to be understood that systems and methods are not so limited. For example, the cloud system 240 can transmit the plurality of customized audio messages to a security system keypad, a security system control panel, or any other device that is registered with the cloud system 240 to receive the plurality of customized audio messages, and such a device can audibly emit the plurality of customized audio messages received.

Furthermore, although systems and methods are disclosed and described herein in connection with the user device receiving the plurality of customized audio messages via user input, it is to be understood that systems and methods disclosed herein are not so limited. For example, in some embodiments, the memory device associated with the cloud system 240 can store a plurality of default audio messages that are loaded during manufacturing in a factory. However, even in these embodiments, the cloud system 240 can access the memory device to identify a default audio message associated with the zone fault message received from the security system control panel 220. Accordingly, in some embodiments, in addition to or as an alternate to the cloud system 240 accessing the cloud memory device to identify the customized audio message associated with the zone fault message received from the security system control panel 220, the cloud system 240 can use the default audio messages or portions thereof to automatically translate the zone fault message to the customized audio message that describes the zone fault message in a manner that is easily understood by the user.

Further still, although systems and methods are disclosed and described herein in connection with zone fault messages, it is to be understood that systems and methods disclosed herein are not so limited. Instead, systems and methods disclosed herein can be used in connection with any security system message as would be understood by one of ordinary skill in the art, for example, a security system message that identifies a zone number of a zone in the monitored region and a status of the zone, such as fault, trouble, alarm, or the like.

For example, in some embodiments, systems and methods disclosed herein can automatically translate the security system message to the customized audio message that describes the security system message in a manner that is easily understood by the user by, for example, identifying the zone number in the security system message, identifying the name of the corresponding zone from the memory device, identifying the status of the zone in the security system message, and identifying the corresponding text or audio to describe the status of the zone from the memory device. Then, systems and methods disclosed herein can translate the security system message to the customized audio message using the identified name of the zone and the identified audio. For example, systems and methods disclosed herein can translate a security system message of "Zone 002 is Fault" to a customized audio message of "Bathroom window is broken" by identifying the name of zone 002 as the bathroom and by identifying the audio or text of "broken" to describe the fault status. Similarly, systems and methods disclosed herein can translate a security system message of "Zone 009 is Trouble" to a customized audio message of "Bedroom is smoking" by identifying the name of zone 009 as the bedroom and by identifying the audio or text of "smoking" to describe the trouble status. In the same manner, systems and methods disclosed herein can translate a security system message of "Zone 230 is Alarm" to a customized audio message of "Library door is open" by identifying the name of zone 230 as the library and by identifying the audio or text of "open" to identify the alarm status.

It is to be understood that systems and methods disclosed herein can be executed and controlled by the cloud system 240 and that cloud system 240 can include a memory device and a transceiver device each of which can be in communication with control circuitry, one or more programmable processors, and executable control software as would be understood by one of ordinary skill in the art. The executable control software can be stored on a transitory or non-transitory computer readable medium, including but not limited to, local computer memory, RAM, optical storage media, magnetic storage media, flash memory, and the like.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
receiving a security system message at a cloud system from a security system control panel;
determining whether a memory device associated with the cloud system includes preconfigured message data associated with the security system message;
when the memory device fails to include the preconfigured message data, identifying a zone number of a monitored region from contents of the security system message, identifying a user intelligible description of a name of a zone corresponding to the zone number by cross-referencing the zone number with a first of a plurality of default messages stored in the memory device, identifying a status of the zone from the contents of the security system message, identifying a user intelligible description of the status of the zone by cross-referencing the contents of the security system message with a second of the plurality of default messages, and combining the first of the plurality of default messages and the second of the plurality of default messages to construct a default customized message;

and transmitting the default customized message from the cloud system to a user device for audible transmission of the default customized message.

2. The method of claim 1 further comprising:

receiving the preconfigured message data at the cloud system from the user device for storage in the memory device responsive to a user prompt that includes the security system message.

3. The method of claim 1 further comprising:

receiving user input at the cloud system from the user device to update the preconfigured message data without changing an interface with the security system control panel.

4. The method of claim 1 further comprising:

translating text of the default customized message to speech to be contained in the default customized message prior to transmitting the default customized message from the cloud system to the user device.

5. The method of claim 1 wherein the user device is registered to receive the default customized message responsive to the security system control panel transmitting the security system message.

6. The method of claim 1 further comprising:

when the memory device includes the preconfigured message data, cross-referencing the security system message with the preconfigured message data to identify a user customized message from the memory device that corresponds to the security system message; and transmitting the user customized message from the cloud system to the user device for audible transmission of the user customized message.

7. A system comprising:

a transceiver device;

a programmable processor; and executable control software stored on a non-transitory computer readable medium, wherein the transceiver device receives a security system message from a security system control panel, wherein the programmable processor and the executable control software determine whether a memory device includes preconfigured message data associated with the security system message, wherein, when the memory device fails to include the preconfigured message data, the programmable processor and the executable control software identify a zone number of a monitored region from contents of the security system message, identify a user intelligible description of a name of a zone corresponding to the zone number by cross-referencing the zone number with a first of a plurality of default messages stored in the memory device, identify a status of the zone from the contents of the security system message, identify a user intelligible description of the status of the zone by cross-referencing the contents of the security system message with a second of the plurality of default messages, and combine the first of the plurality of default messages and the second of the plurality of default messages to construct a default customized message, and wherein the transceiver device transmits the default customized message to a user device for audible transmission of the default customized message.

8. The system of claim 7 wherein the transceiver device receives the preconfigured message data from the user device for storage in the memory device responsive to a user prompt that includes the security system message.

9. The system of claim 7 wherein the transceiver devices receives user input from the user device to update the preconfigured message data without changing an interface with the security system control panel.

10. The system of claim 7 wherein the programmable processor and the executable control software translate text of the default customized message to speech to be contained in the default customized message prior to transmitting the default customized message to the user device.

11. The system of claim 7 wherein the user device is registered to receive the default customized message responsive to the security system control panel transmitting the security system message.

12. The system of claim 7 wherein, when the memory device includes the preconfigured message data, the programmable processor and the executable control software cross-reference the security system message with the preconfigured message data to identify a user customized message from the memory device that corresponds to the security system message, and wherein the transceiver device transmits the user customized message to the user device for audible transmission of the user customized message.

\* \* \* \* \*